United States Patent [19]

Tadi et al.

[11] Patent Number: 5,118,118
[45] Date of Patent: Jun. 2, 1992

[54] SEALING ASSEMBLY WITH A MAGNETIC LIQUID

[75] Inventors: Vedran A. Tadi, Culemborg, Netherlands; Börge Andersson, Sandared, Sweden

[73] Assignee: SKF Industrial Trading and Development Company B.V., Nieuwegein, Netherlands

[21] Appl. No.: 381,384

[22] Filed: Jul. 18, 1989

[30] Foreign Application Priority Data

Aug. 2, 1988 [NL] Netherlands ............ 8801925

[51] Int. Cl.⁵ ............................................. F16J 15/44
[52] U.S. Cl. ............................................. 277/80; 277/135
[58] Field of Search ............ 277/80, 135; 384/133, 384/477, 8, 446

[56] References Cited

U.S. PATENT DOCUMENTS

| | | | |
|---|---|---|---|
| 2,996,162 | 8/1961 | Lehde | 277/80 X |
| 4,171,818 | 10/1979 | Moskowitz et al. | 277/80 |
| 4,533,265 | 8/1985 | Woodbridge | 364/477 |
| 4,673,997 | 6/1987 | Gowda et al. | 277/80 X |
| 4,761,082 | 8/1988 | Gabelli | 277/80 X |
| 4,765,756 | 8/1988 | Gabelli | 277/80 X |
| 4,817,964 | 4/1989 | Black, Jr. | 277/80 X |

FOREIGN PATENT DOCUMENTS

| | | | |
|---|---|---|---|
| 135269 | 10/1980 | Japan | 277/80 |
| 12167 | 1/1982 | Japan | 277/80 |
| 110080 | 5/1985 | Japan | 277/80 |
| 962707 | 9/1982 | U.S.S.R. | 277/80 |
| 2146079 | 4/1985 | United Kingdom | 277/80 |

Primary Examiner—Allan N. Shoap
Assistant Examiner—Scott W. Cummings
Attorney, Agent, or Firm—Eugene E. Renz, Jr.

[57] ABSTRACT

A sealing assembly forming a seal using a magnetic liquid around a rotatable shaft, comprising an armature for conducting a magnetic field, the armature having a free end adjacent the shaft to form an annular sealing gap; a quantitiy of magnetic liquid contained in the sealing gap by the magnetic field; and at least one covering member mounted on the assembly on one side of the gap to cooperatively define a space with the shaft for containing an amount of fluid at least two times the volume of the gap.

3 Claims, 2 Drawing Sheets

SEALING ASSEMBLY WITH A MAGNETIC LIQUID

FIELD OF THE INVENTION

The invention relates to a sealing assembly for the purpose of forming a seal by means of a magnetic liquid around a shaft capable of being driven in rotation. The assembly includes a permanent magnet and at least one armature being in connection with one of the poles thereof. The free end of the armature is situated at a short distance from the shaft to form an annular sealing gap which is filled with a quantity of the magnetic liquid. The liquid is held within the sealing gap by the magnetic field set up by the permanent magnet by way of the armature. Such a sealing assembly is disclosed by European Patent Application 0,182,656.

BACKGROUND OF THE INVENTION

The assembly includes a permanent magnet and at least one armature being in connection with one of the poles thereof. The free end of the armature is situated at a short distance from the shaft to form an annular sealing gap which is filled with a quantity of the magnetic liquid. The liquid is held within the sealing gap by the magnetic field set up by the permanent magnet by way of the armature. Such a sealing assembly is disclosed by European Patent Application 0,182,656.

Sealing assemblies of this type are used especially for drive spindles of computer disks, and are used to prevent lubricant, vapor and/or dust from getting within reach of the magnetic disks.

In sealing assemblies of this type it has been discovered that the degree of the static pressure of the magnetic liquid in the sealing gap is critical for proper performance of the assembly. It has been found that this static pressure reaches a maximum when the quantity of magnetic liquid equals 1.5 times the volume of the sealing gap. Moreover, it has been discovered that an increase in this quantity of magnetic liquid will not further increase the static pressure.

One problem with prior art designs is that this quantity of magnetic liquid presents a problem, for example in storage, transport or the like circumstances of the sealing assembly. This problem is that the static pressure decreases with time, namely to about 40% within about 5 hours. This phenomenon is a direct consequence of agglomeration effects in the magnetic liquid. Thus, the assembly can no longer operate at good performance levels.

Further, the magnetic liquid when it is employed at this quantity, has been found to have a tendency to separate into zones of differential concentration of the magnetic particles that the liquid contains. This is caused by the non-homogeneity of the magnetic field in the sealing gap. Under certain circumstances, there is danger in rotation of the shaft that magnetic liquid will be forced out of the sealing gap.

A quantity of magnetic liquid amounting to 2.5 times the volume of the sealing gap is difficult to attain because under dynamic conditions magnetic liquid present outside the sealing gap will be spread over the surrounding parts of the assembly and contaminate them.

In the known sealing assembly, therefore, the armature has a stepped or tapered end situated around the shaft, so that essentially two sealing gaps are formed, one filled with magnetic liquid and the other an air gap, whereby a comparatively homogeneous magnetic field is set up in the sealing gap first mentioned. But this complicates the sealing assembly, unnecessarily and causes failure.

SUMMARY OF THE INVENTION

The invention relates to an improved sealing assembly of the type described. This is accomplished in the sealing assembly according to the invention, by having at least one covering member mounted on the assembly. This member is near at least one side of the sealing gap, to form a sapce in combination together with a part of the shaft projecting from the gap on this side.

Surprisingly, it has been found that this covering member, simple in itself, has the unexpected effect that the quantity of magnetic liquid may now be at least 2.0 and preferably 2.5 times the volume of the sealing gap or more, without any spreading of the magnetic liquid outside of the sealing gap under dynamic conditions.

Preferably, the covering member is arranged on one side of the armature, and the member has a lip-like end directed outward in relation to the said side and towards the shaft, bounding or defining the space.

One embodiment includes a sealing assembly having two armatures, each being in connection with a respective pole of the annular permanent magnet. Thus, two sealing gaps are located at a distance from each other and filled with magnetic liquid. In this embodiment according to this invention, the covering member comprises an annular troughlike member open inward which embraces the armatures and the extremity of the permanent magnet. The edges of which are each in the form of the lip-like extremity.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
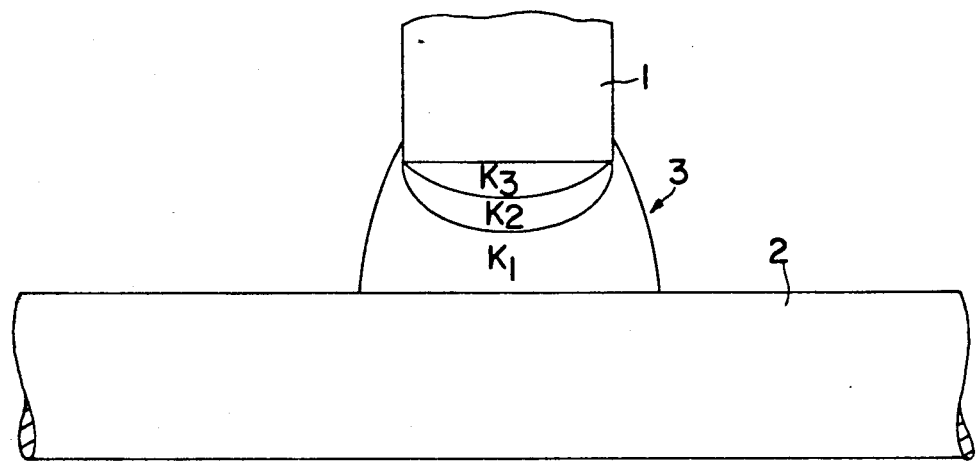
FIG. 1 shows a sealing gap formed between an armature and a shaft, said gap being filled with a quantity of magnetic liquid amounting to 1.5 times the volume of the sealing gap.

In FIG. 1, a sealing gap formed between the free ends of an armature 1 and a shaft 2 is shown, filled with a quantity of magnetic liquid 3 amounting to 1.5 times the volume of the sealing gap. With this quantity of magnetic liquid, a separation occurs into zones of differential concentrations of the magnetic particles, which concentrations are indicated by K1, K2, and K3, where K1 is less than K and K is less than K2 and K2 is less than K3. K is the normal uniform concentration of the magnetic particles in the magnetic liquid.

FIG. 1 of the accompanying drawing shows non-homogeneous zones, the concentration K1 of the magnetic particles in the zone in question being less than the normal uniform concentration K, and moreover K1 is less than K2 and it is less than K3.

Some improvement may be obtained by employing a quantity of magnetic liquid amount to at least 2.0 and preferably 2.5 times the volume of the sealing gap. Then a concentration distribution is obtained as shown in FIG. 2, where in the outermost zone a concentration K4 is less than K is obtained, and in the inner zones, concentrations K5, K6, K7 where K5 is less than K, K6 is less than K5 and K7 is less than K6, so that throughout the innermost zone the concentration is greater than K.

Figure 2:
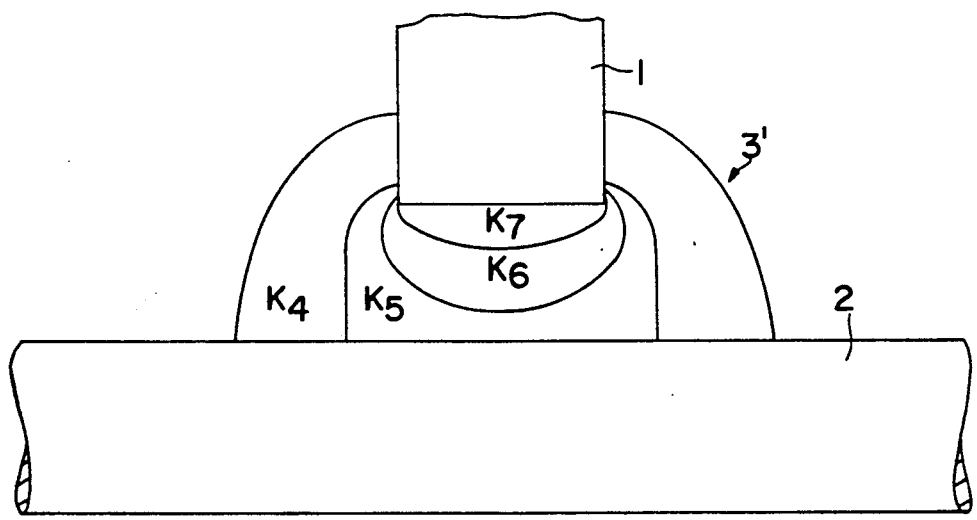
FIG. 2 shows the same sealing gap as in FIG. 1, this gap being filled with a quantity of magnetic liquid amounting to 2.5 times the volume of the sealing gap.

FIG. 2 shows the same sealing gap as in FIG. 1, but with the quantity of magnetic liquid 3' amounting to 2.5 times the volume of the sealing gap. Then in said quantity of magnetic liquid a separation occurs into zones of differential concentrations of the magnetic particles, which concentrations are indicated by K4, K5, K6 and K7, where K4 is less than K which is less than K5 which is less than K6 which is less than K7.

In order to be able to maintain this quantity of magnetic liquid in the sealing gap without danger that, under dynamic conditions, magnetic liquid present outside of the sealing gap will be spread over the surroundings parts of the assembly, the sealing assembly according to the invention is provided with a covering member.

Figure 3:
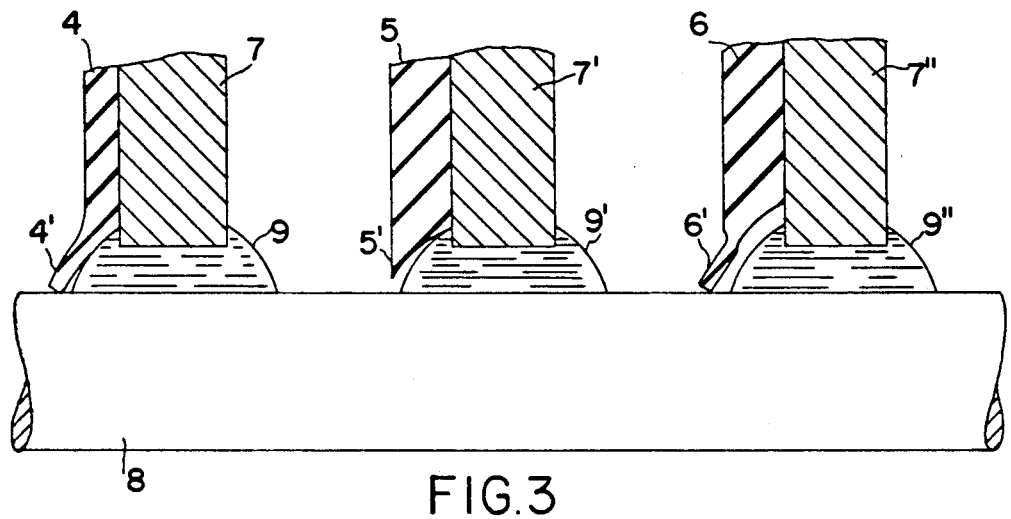
FIG. 3 shows three embodiments of the covering member according to the invention.

FIG. 3 shows three embodiments of this covering member, 4, 5, 6 respectively, arranged against one side of the armatures 7, 7' and 7" respectively, which armatures together with the shaft 8 form sealing gaps filled with the quantity of magnetic liquid 9, 9', 9" respectively.

The covering members 4, 5, 6 have lip-like extremities 4', 5' and 6' respectively, each of which essentially together with a part of the shaft 8 projecting from a sealing gap defines a space near one side of the sealing gap. These lip-like ends may be of different shapes, depending on the requirements imposed upon these parts, including whether or not they will make sealing contact with the shaft.

Figure 4:
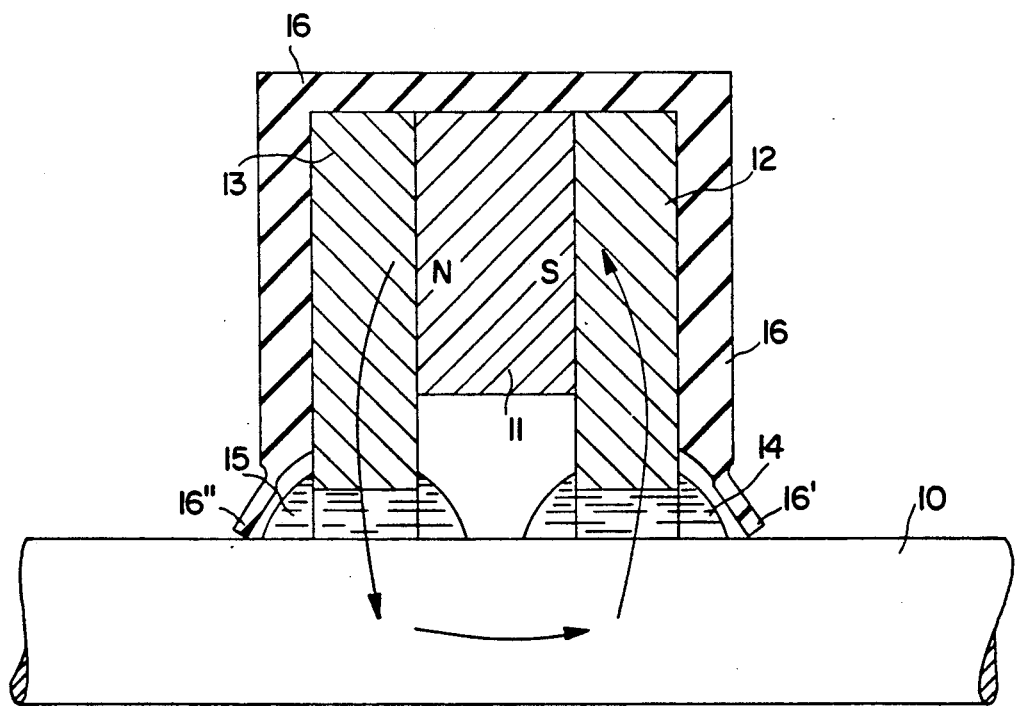
FIG. 4 shows a sealing gap according to the invention having two armatures.

The sealing assembly shown in FIG. 4, in order to form a seal by means of a magnetic liquid around a shaft 10, capable of being driven in rotation, comprises an annular permanent magnet 11 having two armatures 12 and 13 in contact with it. Each armature 12, 13 forms, with the shaft 10, a sealing gap filled with a quantity of magnetic liquid 14, 15. As can be seen in FIG. 4, the sealing gap for the two armatures is defined by the axial length of the free end of each armature and the radial distance between the free end and the shift 10. Lines extend down from armatures 12 and 13 to define these gaps. The covering member 16 is in the form of an annular trough open inward that embraces the armatures 12, 13 and the outside of the permanent magnet 11, so that this covering member also keeps the two armatures 12, 13 and the permanent annular magnet 11 in place. The edges of the covering member 16 are in the form of lip-like parts 16', 16", similar to the lip-like parts 6' shown in FIG. 3.

The covering member 16 is made for example of a polymer, rubber or some non-magnetic metal. When it is desired that the sealing assembly be electrically conductive, for example to carry off static charge in a computer disk drive, carbon particles may be incorporated in the rubber of the covering member.

While particular embodiments of the present invention have been illustrated and described herein, it is not intended to limit the invention and changes and modifications may be made therein within the scope of the following claims.

What is claimed is:

1. Sealing assembly to form a seal by means of a magnetic liquid around a shaft having an axis of rotation and capable of being driven in rotation about said axis, comprising an annular permanent magnet having axial poles and two armatures, each armature being in connection with one of the poles thereof, the free end of each armature located at a short distance from the shaft to form two annular sealing gaps defined by the axial length of said free end of said armature and the radial distance between said free end and said shaft, said two gaps being located a distance from each other and filled with a quantity of magnetic liquid to be held within said sealing gaps by said magnetic field generated by said permanent magnet by way of the armature, said assembly including a unitary, non-magnetic covering member (16) comprising an annular, trough-like member open radially inward and contacting the armatures (12, 13) and the radial outside of said annular permanent magnet (11), said cover member having terminal edges formed in flexible liplike end parts (16', 16") which each engage the shaft at a point axially outside said cover and away from said armature.

2. Sealing assembly according to claim 1, characterized in that the trough-like member (16) is made of rubber or a similar material.

3. Sealing assembly according to claim 2, characterized in that carbon particles are incorporated in the rubber to render it electrically conductive.

* * * * *

UNITED STATES PATENT AND TRADEMARK OFFICE
CERTIFICATE OF CORRECTION

PATENT NO. : 5,118,118
DATED : June 2, 1992
INVENTOR(S) : Vedran A. Tadic and Borge Andersson It is certified that error appears in the above-identified patent and that said Letters Patent is hereby corrected as shown below:

Title page, item [75], change the inventor's name from "Tadi" to --Tadic--.

Column 3, line 49; delete the word "shift" and insert the word --shaft--.

Signed and Sealed this

Twelfth Day of October, 1993

Attest:

BRUCE LEHMAN

*Attesting Officer*     *Commissioner of Patents and Trademarks*